United States Patent [19] [11] 4,345,830
Aratame [45] Aug. 24, 1982

[54] MOTOR DRIVEN TYPE CAMERA
[75] Inventor: Kazuhisa Aratame, Hachioji, Japan
[73] Assignee: Konishiroku Photo Industry Co., Ltd., Japan
[21] Appl. No.: 237,686
[22] Filed: Feb. 24, 1981
[30] Foreign Application Priority Data
Mar. 4, 1980 [JP] Japan .................................. 55-26190
[51] Int. Cl.³ .............................................. G03B 1/12
[52] U.S. Cl. ..................................... 354/173; 354/209
[58] Field of Search ................................ 354/173, 209
[56] References Cited
U.S. PATENT DOCUMENTS
4,021,826  5/1977  Iwata et al. ........................ 354/209

Primary Examiner—Michael L. Gellner
Attorney, Agent, or Firm—Linda G. Bierman; Jordan B. Bierman

[57] ABSTRACT

A motor driven type camera includes a shutter charging motor, a film winding motor, and a selecting member selectively operable for preventing only the film winding motor from being driven so as to enable selective performance of multiple exposures. A logic driven automatic restoration circuit activates a solenoid to return the selecting member to its inoperative condition following completion of a user-initiated multiple exposure to thereby prevent a subsequent inadvertent exposure of the same frame of film as a consequence of the user's having forgotten to return the selecting member to its normal or initial position.

6 Claims, 4 Drawing Figures

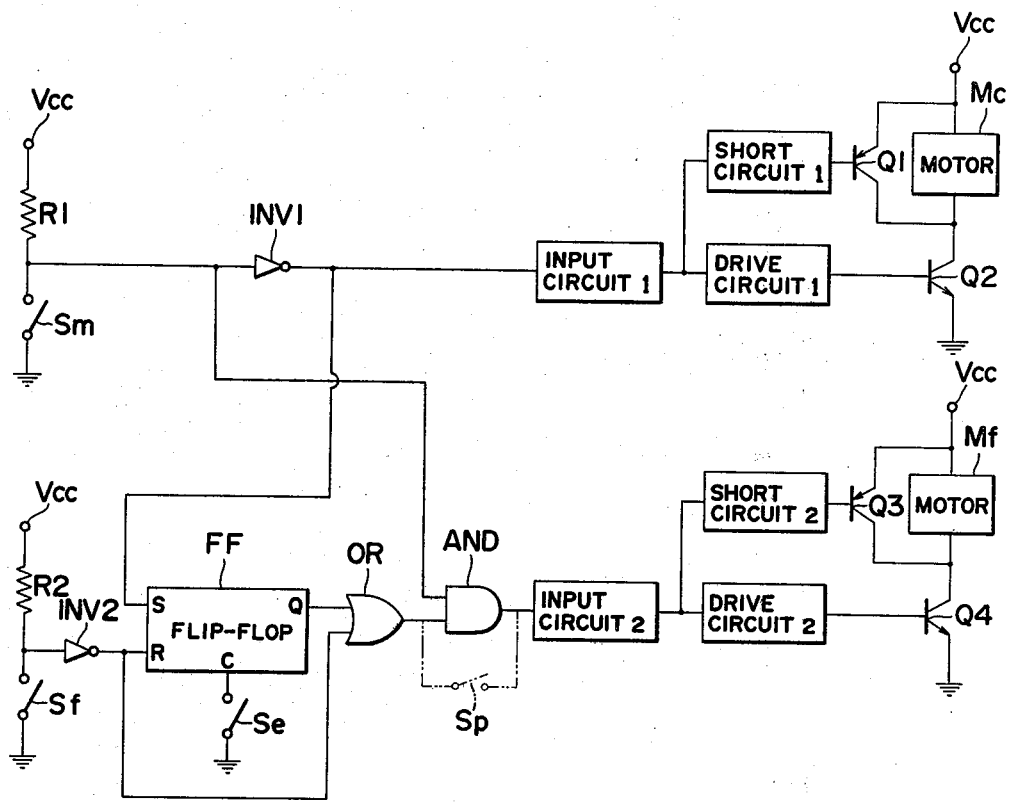

MOTOR DRIVEN TYPE CAMERA

BACKGROUND OF THE INVENTION

1. Field of the Invention

This invention relates to an improved camera having a motor for charging the shutter and a motor for winding the film, each motor being driven by an external signal, and more particularly relates to a motor driven camera which can be used for multiple exposure.

2. Description of the Prior Art

In a conventional camera—such as a 35-mm still camera—it is necessary to disengage the motion transmitting device or to cause it to slip in order to prevent rotation of the film winding sprocket or reel when multiple exposure is desired. This requires a complicated motion transmitting device and the consumption of an excessive amount of power.

SUMMARY OF THE INVENTION

An object of the present invention is to provide a motor driven type camera having no such drawbacks yet enabling multiple exposure. The motor driven camera of the present invention includes a motor for charging the shutter, a motor for winding the film, and a selecting member for preventing operation of only the film winding motor.

This and other objects, as well as advantageous features, of the present invention will become more apparent from the following description of preferred embodiments thereof, when taken in conjunction with the accompanying drawings.

BRIEF DESCRIPTION OF THE DRAWINGS

FIG. 1 is a circuit diagram of one embodiment of a motor driven camera in accordance with the present invention;

FIG. 2 is a motion timing chart of the camera of FIG. 1;

DETAILED DESCRIPTION OF THE PREFERRED EMBODIMENTS

Figure 3:
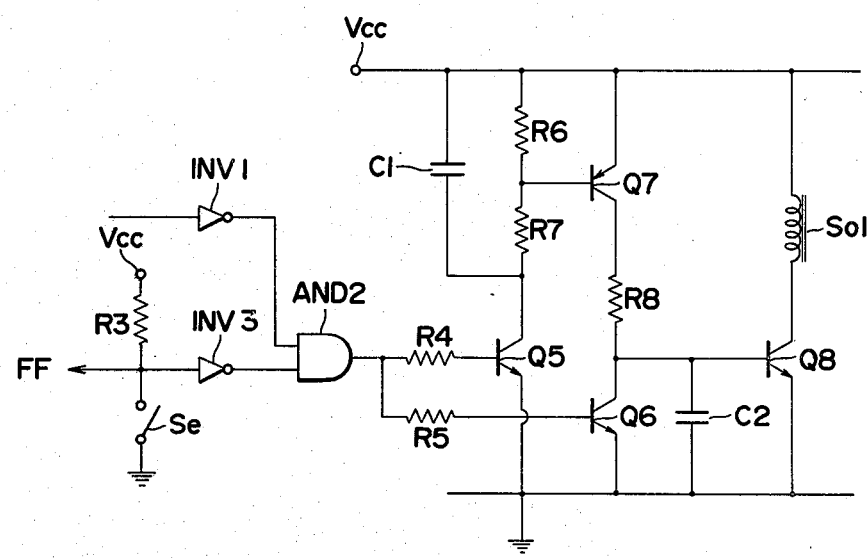
FIG. 3 is a circuit diagram of an automatic restoration circuit for preventing one from forgetting that a multiple exposure selecting member has been switched.

In FIG. 1, symbol Sm identifies a switch which is closed (the "on" state) on completion of the running of a following plane of a focal plane shutter or the closing motion of a lens shutter—i.e. the exposure is completed—and which opens (the "off" state) on completion of the shutter or mirror charge of a single lens reflex camera. Sf denotes a switch which closes (the "on" state) when film winding begins and which is opened (the "off" state) when the film has been wound by one frame. Se designates a switch for multiple exposure and which serves as a selecting member for disabling operation only of film winding motor Mf. $INV_1$ and $INV_2$ are inverter circuits; AND is a logical AND gate circuit; OR is a logical OR gate circuit; FF is a flip-flop circuit; $Q_1$, $Q_2$, $Q_3$ and $Q_4$ are transistors; Mc is a motor for charging the shutter or mirror of a single lens reflex camera; $R_1$ and $R_2$ are resistors; and Vcc is a terminal of an electric power source.

In normal photography, multiple exposure switch Se is not operated and remains in its "off" state, and in this state flip-flop FF is operable. Where the shutter is charged and film winding has been completed, switches Sm and Sf are "off" or open.

Accordingly, where the shutter is charged and film winding completed, the inputs to inverters $INV_1$ and $INV_2$ are at high level (logical "1") and their outputs are at low level (logical "0"), so that an input circuit 1 directly receiving the output of inverter $INV_1$ does not operate a drive circuit 1 and shutter charging motor Mc is not driven. At the same time, the output of flip-flop FF—which flip-flop receives the outputs of inverters $INV_1$ and $INV_2$ at its set terminal S and its reset terminal R, respectively—is at low level ("0") and thus both inputs of the OR gate are "0", so that the output of the OR gate is likewise logical "0". The OR gate output is applied to the AND gate—so that its output remains at logical "0"—and an input circuit 2 to which the output of the AND gate is applied does not drive a drive circuit 2. As a consequence, film winding motor Mf is not driven.

When a shutter release operation is carried out, the photographing sequence begins with the FIG. 1 circuitry in the above-described state and, when exposure is completed, switch Sm is moved to its "on" or closed state. With switch Sm closed, the input of inverter $INV_1$ is changed to low level ("0"), and its output becomes high ("1") and is applied to input circuit 1 and the set terminals S of flip-flop FF. Drive circuit 1 is driven by input circuit 1 so that transistor $Q_2$ becomes conductive. Input circuit 1 also drives a short circuit 1 so that transistor $Q_1$ becomes nonconductive. Accordingly, only shutter charging motor Mc is rotated. On the other hand, flip-flop FF is switched to its set state and the output at its terminal Q becomes "1", whereby the output of the OR gate also becomes logical "1". However, the output of the AND gate remains at "0"—and film winding motor Mf is not driven—because one input of the AND gate remains at "0" being the input of inverter $INV_1$.

When shutter charging motor Mc is rotated and the shutter charge completed, switch Sm (which has been closed) opens, so that the input of inverter $INV_1$ and the aforementioned one input of the AND gate are changed to "1". As a consequence, the output of inverter $INV_1$ becomes "0", so that drive circuit 1 is not operated by input circuit 1 and transistor $Q_2$ becomes nonconductive. At the same time, short circuit 1 is not operated by input circuit 1—so that transistor $Q_1$ becomes conductive—and the shutter charging motor Mc is rapidly stopped. On the other hand, the output of the AND gate becomes "1" whereby drive circuit 2 is driven by input circuit 2 and transistor $Q_4$ is rendered conductive. Film winding motor Mf is thereby driven and rotates to carry out the film winding operation.

When film winding begins, switch Sf is closed and the input of inverter $INV_2$ becomes "0" so that flip-flop FF is reset and the output at its terminal Q switches to logical "0". In this state, the output of the OR gate remains at "1" since the "1" output of inverter $INV_2$ is applied to one of the OR gate inputs; the output of the AND gate accordingly remains at "1" and the film winding motor Mf continues to operatively rotate. When the film has been wound by one frame, the input of inverter $INV_2$ becomes "1" (as switch Sf opens) and its output becomes "0", so that both inputs of the OR gate are at logical "0" and its output becomes "0". The output of the AND gate thus becomes "0" and drive circuit 2 is disabled or not operated by input circuit 2, whereby transistor Q4 becomes nonconductive. Short circuit 2 is likewise not operated by input circuit 2, and transistor Q3 becomes conductive whereby the film winding motor Mf is rapidly stopped. This condition in which the film winding motor Mf is stopped is similar to the initial state in which shutter charging is carried out and film winding completed, so that if the shutter release operation is carried out normal photographing can be performed. The relative operating timing of switches Sm, Sf and of motors Mc, Mf is shown in FIG. 2, wherein t represents the interval between the start of film winding and the switching of switch Sf to its "on" state (switch closure).

When multiple exposure is desired, switch Se is closed or switched "on". In this condition, flip-flop FF is inoperative—i.e. its output at terminal Q is logical "0" regardless of the presence or absence of inputs at its set terminal S and its rest terminal R. If the shutter release operation is then carried out and the exposure completed by starting the photographing sequence, switch Sm closes, the input of inverter $INV_1$ becomes "0", and the inverter output becomes "1". As a result, the shutter charging motor Mc is rotated and the shutter charged, as in normal photographing. However, flip-flop FF is not set, its output at terminal Q remains at "0", and the output of inverter $INV_2$ is at "0" (because switch Sf is open when film winding motor Mf is not driven) so that the output of the OR gate remains at "0".

When shutter charging is completed and switch Sm opens, the shutter charging motor Mc is stopped and an input of logical "1" is applied to one of the AND gate inputs. However, the output of the AND gate remains at "0" (its other input being "0") and film winding by motor Mf is not carried out. The release operation can accordingly be performed once again to effect a double exposure. If the release operation is thereafter repeated each time the shutter charging motor Mc is stopped—without changing the switch Se to its "off" or open condition—a multiple exposure of three or more exposures can be performed.

A multiple exposure can thus be performed in accordance with the invention without causing the motion transmitting device to be complicated in a motor driven type camera. Moreover, excessive power consumption in the multiple exposure mode is avoided because the film winding motor is not rotated or driven.

Further, in the embodiment shown in FIG. 1, if multiple exposure switch Se is automatically returned from its "on" to its "off" state after switch Sm is opened on completion of shutter charging, normal film winding will be carried out after the exposure in accordance with shutter charging in the next release operation. Thus, a triple exposure resulting from forgetting to switch "off" multiple exposure switch Se can be prevented. FIG. 3 shows a circuit diagram for returning switch Se to its "off" state, the FIG. 3 circuit being added to the circuit of FIG. 1 to achieve such switch return.

In FIG. 3, the designations $INV_1$ and Se correspond to inverter circuit $INV_1$ and multiple exposure switch Se seen in FIG. 1. Sol is a solenoid for switching switch Se from its "on" to its "off" condition or state. $R_3$, $R_4$, $R_5$, $R_6$, $R_7$ and $R_8$ are resistors; $INV_3$ is an inverter; AND2 is an AND gate; $Q_5$, $Q_6$, $Q_7$ and $Q_8$ are transistors; $C_1$ and $C_2$ are capacitors; and Vcc is one terminal of an electric power source.

The condition in which multiple exposure switch Se is "off" (open) so that terminal C of flip-flop FF—to which a voltage Vcc is applied—is at logical "1" is similar to the condition in which multiple exposure switch Se in FIG. 1 is "off". In this condition, flip-flop FF is operable. The input of inverter $INV_3$ is "1" and its output is "0", so that the output of gate AND2 remains "0" irrespective of the output of inverter $INV_1$. Solenoid Sol is not operated because transistors $Q_5$ and $Q_6$ are rendered nonconductive, and transistor $Q_7$ is likewise nonconductive as is transistor $Q_8$. Thus, the FIG. 3 circuit has no effect on the circuit shown in FIG. 1 in normal photographing.

However, if multiple exposure switch Se is switched "on" to enable a multiple exposure, terminal C of flip-flop FF goes to logical "0" rendering flip-flop FF inoperative so that the input of inverter $INV_3$ becomes "0". As a consequence, the output of inverter $INV_3$ becomes "1" and the output of gate AND2 is affected by the output of inverter $INV_1$, whereby the FIG. 3 circuit is rendered operative. In this condition, if the release operation is carried out as in the case of multiple exposure with respect to the circuit shown in FIG. 1, switch Sm closes when the exposure is completed and the output of inverter $INV_1$ is changed to "1" so that the output of the gate AND2 becomes "1", transistors $Q_5$ and $Q_6$ are rendered conductive, capacitor $C_1$ charges through conductive transistor $Q_5$ and transistor $Q_7$ becomes conductive. However, even though transistor $Q_7$ becomes conductive no base current flows into transistor $Q_8$ because of the conduction of transistor $Q_6$; transistor $Q_8$ therefore remains nonconductive, solenoid Sol is not operated, and multiple exposure switch Se is maintained in its closed or "on" state.

When switch Sm is switched "off" on completion of shutter charging the output of inverter $INV_1$ is changed to "0" and the output of gate AND2 also becomes "0", so that transistors $Q_5$ and $Q_6$ are rendered nonconductive. Even so, transistor $Q_7$ does not immediately become nonconductive, but instead continues to conduct for a period corresponding to the discharge time of capacitor $C_1$; this discharge time or time constant $t_1$ is determined by capacitor $C_1$ and resistors $R_6$, $R_7$. Thus, when transistor $Q_6$ becomes nonconductive base current flows into transistor $Q_8$, rendering it conductive, so that solenoid Sol is operated and multiple exposure switch Se is switched "off".

Conduction of transistor $Q_8$ is delayed from the interruption or change to the nonconductive state of transistor $Q_6$ for a period corresponding to a time constant $t_2$ determined by resistor $R_8$ and capacitor $C_2$; return of multiple exposure switch Se after switch Sm has been switched "off" (the completion of shutter charging) is thereby assured. The situation in which switching of switch Sm to its "off" state and of switch Se to its "off" state overlap is therefore reliably and positively prevented so as to avoid failure of switch Se to remain "on" for a desired multiple exposure operation.

Figure 4:
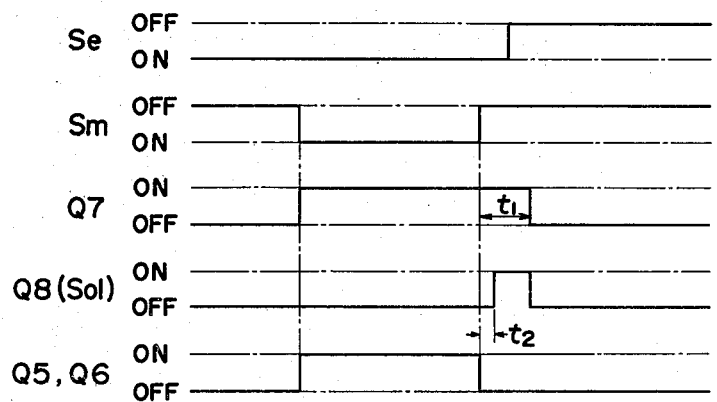
FIG. 4 is a motion timing chart of the camera of FIG. 3.

The timing of this operation of the FIG. 3 circuit is shown in FIG. 4. When the release operation is carried out again, shutter charging motor Mc as well as film winding motor Mf are operatively rotated following the double exposure, and an accidental triple exposure prevented, because in this condition multiple exposure switch Se has been automatically switched "off".

FIG. 1 depicts an embodiment in which the film winding motor Mf is rotated after rotation of the shutter charging motor Mc. However, given sufficient capacity of the electric power source—such as a battery—both motors can be rotated at the same time. As shown in FIG. 1 by a double-dot-and-dash line, if the output terminal of the OR gate and the output terminal of the AND gate are connected together through a switch Sp and switch Sp is closed or switched "on", motors Mc and Mf are rotated concurrently when multiple exposure switch Se is in its "off" or open state.

I claim:

1. In a motor driven camera which includes a motor for charging a shutter of the camera, a motor for winding film in the camera, and control circuit means for driving the shutter charging motor and the film winding motor in response to external signals input to the control circuit means, the improvement comprising:

a selecting switch connected to the control circuit means and selectively movable between a first position in which the camera operates in a normal photographic mode such that the shutter is charged by the charging motor and the film is advanced to a successive frame thereof by the winding motor following each photographic exposure operation, and a second position for enabling multiple exposure photography in which the shutter charging motor is operable normally to charge the shutter but the film winding motor is disabled to prevent advancement of the film following a photographic exposure operation while said switch is in its second position so that multiple exposure of a single film frame is enabled; and automatic restoration circuit means connected to said control circuit means for automatically returning said selecting switch from its second to its first position following a photographic exposure operation during which said switch has been in its second position to disable the film winding motor and thereby enable multiple exposure photography, whereby inadvertent further multiple exposure of a film frame immediately following a desired multiple exposure thereof and due to a user's forgetting to return said switch from its second to its first position is positively prevented by said automatic restoration circuit.

2. In a motor driven camera in accordance with claim 1, said automatic restoration circuit means including a solenoid connected to said selecting switch and operable to return said switch from its second to its first position following completion of a multiple exposure operation.

3. In a motor driven camera in accordance with claim 2, said automatic restoration circuit means further including transistor switching means for controlling the operation of said solenoid in accordance with the position of said selecting switch.

4. In a motor driven camera in accordance with claim 3, said automatic restoration circuit means including at least a resistor and a capacitor connected with said transistor switching means to delay said return of the selecting switch from its second to its first position for a predetermined time period following completion of a multiple exposure photographic operation so as to avoid possible interference with normal operation of the control circuit means during and immediately following a photographic exposure operation.

5. In a motor driven camera in accordance with claim 3, said automatic restoration circuit means further including at least a resistor and a capacitor connected with said transistor switching means to define a predetermined time period during which operating current is supplied by said transistor switching means to said solenoid to operate said solenoid and thereby cause said selecting switch to be returned from its second to its first position.

6. In a motor driven camera in accordance with claim 1, wherein the control circuit means includes a flip-flop logic element, said selecting switch being connected between one terminal of an electric power source for the camera and one terminal of said flip-flop logic element, such that in said second position of the selecting switch said one terminal of the flip-flop circuit is presented with a logic signal that disables said flip-flop from changing its operative state so as to prevent passage of an operating signal to the film winding motor in said second position of the selecting switch.

* * * * *